(12) United States Patent
Saboune et al.

(10) Patent No.: US 10,599,218 B2
(45) Date of Patent: Mar. 24, 2020

(54) HAPTIC CONVERSION SYSTEM USING FREQUENCY SHIFTING

(71) Applicant: Immersion Corporation, San Jose, CA (US)

(72) Inventors: Jamal Saboune, Montreal (CA); Juan Manuel Cruz-Hernandez, Montreal (CA)

(73) Assignee: Immersion Corporation, San Jose, CA (US)

(*) Notice: Subject to any disclaimer, the term of this patent is extended or adjusted under 35 U.S.C. 154(b) by 880 days.

(21) Appl. No.: 14/020,502

(22) Filed: Sep. 6, 2013

(65) Prior Publication Data

US 2015/0070261 A1    Mar. 12, 2015

(51) Int. Cl.
*G06F 3/01* (2006.01)
*G10L 21/16* (2013.01)

(52) U.S. Cl.
CPC .............. *G06F 3/016* (2013.01); *G10L 21/16* (2013.01)

(58) Field of Classification Search
CPC ....................................................... G08B 6/00
USPC ............................................ 340/407.1, 573.1
See application file for complete search history.

(56) References Cited

U.S. PATENT DOCUMENTS

| | | | |
|---|---|---|---|
| 5,684,722 A | 11/1997 | Thorner et al. | |
| 7,515,138 B2 | 4/2009 | Sullivan | |
| 7,979,146 B2 | 7/2011 | Ullrich et al. | |
| 8,000,825 B2 | 8/2011 | Ullrich et al. | |
| 8,378,964 B2 | 2/2013 | Ullrich et al. | |
| 8,502,679 B2* | 8/2013 | Ayon | A61B 5/113 340/384.7 |
| 9,196,134 B2* | 11/2015 | Levesque | G06F 3/016 |
| 2003/0067440 A1* | 4/2003 | Rank | G06F 3/016 345/156 |
| 2003/0068053 A1 | 4/2003 | Chu | |
| 2004/0138769 A1 | 7/2004 | Akiho | |

(Continued)

FOREIGN PATENT DOCUMENTS

| | | | |
|---|---|---|---|
| JP | 2003099177 A | * | 4/2003 |
| JP | 2008-515088 A | | 5/2008 |

(Continued)

OTHER PUBLICATIONS

Jong-Uk Lee et al., "Haptic interaction with user manipulation for smartphone", Consumer Electronics (ICCE), 2013 IEEE International Conference on, IEEE, Jan. 11, 2013, pp. 47-48, XP032348660.

(Continued)

*Primary Examiner* — Brian A Zimmerman
*Assistant Examiner* — Kevin Lau
(74) *Attorney, Agent, or Firm* — Medler Ferro Woodhouse & Mills PLLC

(57) ABSTRACT

A system is provided that converts an input into one or more haptic effects using frequency shifting. The system receives an input signal. The system further performs a fast Fourier transform of the input signal. The system further shifts one or more frequencies of the transformed input signal to one or more frequencies within a shift-to frequency range. The system further performs an inverse fast Fourier transform of the frequency-shifted signal, where the inversely transformed signal forms a haptic signal. The system further generates the one or more haptic effects based on the haptic signal.

34 Claims, 8 Drawing Sheets

(56) References Cited

U.S. PATENT DOCUMENTS

| | | | |
|---|---|---|---|
| 2004/0150650 A1 | 8/2004 | Mendelson et al. | |
| 2007/0285216 A1* | 12/2007 | Tierling | A63F 13/06 340/407.1 |
| 2009/0231276 A1 | 9/2009 | Ullrich et al. | |
| 2010/0066512 A1 | 3/2010 | Rank | |
| 2011/0029041 A1 | 2/2011 | Wiskerke | |
| 2011/0115709 A1 | 5/2011 | Cruz-Hernandez | |
| 2011/0202155 A1 | 8/2011 | Ullrich et al. | |
| 2011/0215913 A1 | 9/2011 | Ullrich et al. | |
| 2012/0206246 A1 | 8/2012 | Cruz-Hernandez et al. | |
| 2012/0206247 A1 | 8/2012 | Bhatia et al. | |
| 2012/0306631 A1* | 12/2012 | Hughes | G09B 21/009 340/407.1 |
| 2013/0131851 A1 | 5/2013 | Ullrich et al. | |
| 2013/0207917 A1 | 8/2013 | Cruz-Hernandez et al. | |
| 2014/0176415 A1* | 6/2014 | Buuck | G06F 3/016 345/156 |

FOREIGN PATENT DOCUMENTS

| | | |
|---|---|---|
| WO | 9914986 A1 | 3/1999 |
| WO | 03032289 A1 | 4/2003 |
| WO | 2006/006528 A1 | 1/2006 |
| WO | 2008127316 A1 | 10/2008 |

OTHER PUBLICATIONS

Jaebong Lee et al., "Real-time perception-level translation from audio signals to vibrotactile effects", Human factors in computing systems, Apr. 27, 2013, pp. 2567-2576, XP058043430.

Henry Da Costa, U.S. Appl. No. 13/439,241, filed Apr. 4, 2012.

Satvir Singh Bhatia, U.S. Appl. No. 13/661,140, filed Oct. 26, 2012.

Christopher J. Ullrich, U.S. Appl. No. 13/785,166, filed Mar. 5, 2013.

Christopher J. Ullrich, U.S. Appl. No. 13/788,487, filed Mar. 7, 2013.

Juan Manuel Cruz-Hernandez, U.S. Appl. No. 13/803,778, filed Mar. 14, 2013.

Juan Manuel Cruz-Hernandez, U.S. Appl. No. 13/799,059, filed Mar. 13, 2013.

Amaya Becvar Weddle et al., U.S. Appl. No. 14/019,606, filed Sep. 6, 2013.

Jamal Saboune et al., U.S. Appl. No. 14/020,461, filed Sep. 6, 2013.

Communication pursuant to Article 94(3) EPC dated Mar. 29, 2018 in corresponding European Patent Application No. 14 002 752.5.

Office Action dated Jun. 12, 2018 in corresponding Chinese Patent Application No. 201410447198.8.

Office Action dated Jul. 3, 2018 in corresponding Japanese Patent Application No. 2014-152842.

The extended European search report issued in European Application No. 19187565.7, dated Oct. 12, 2019.

* cited by examiner

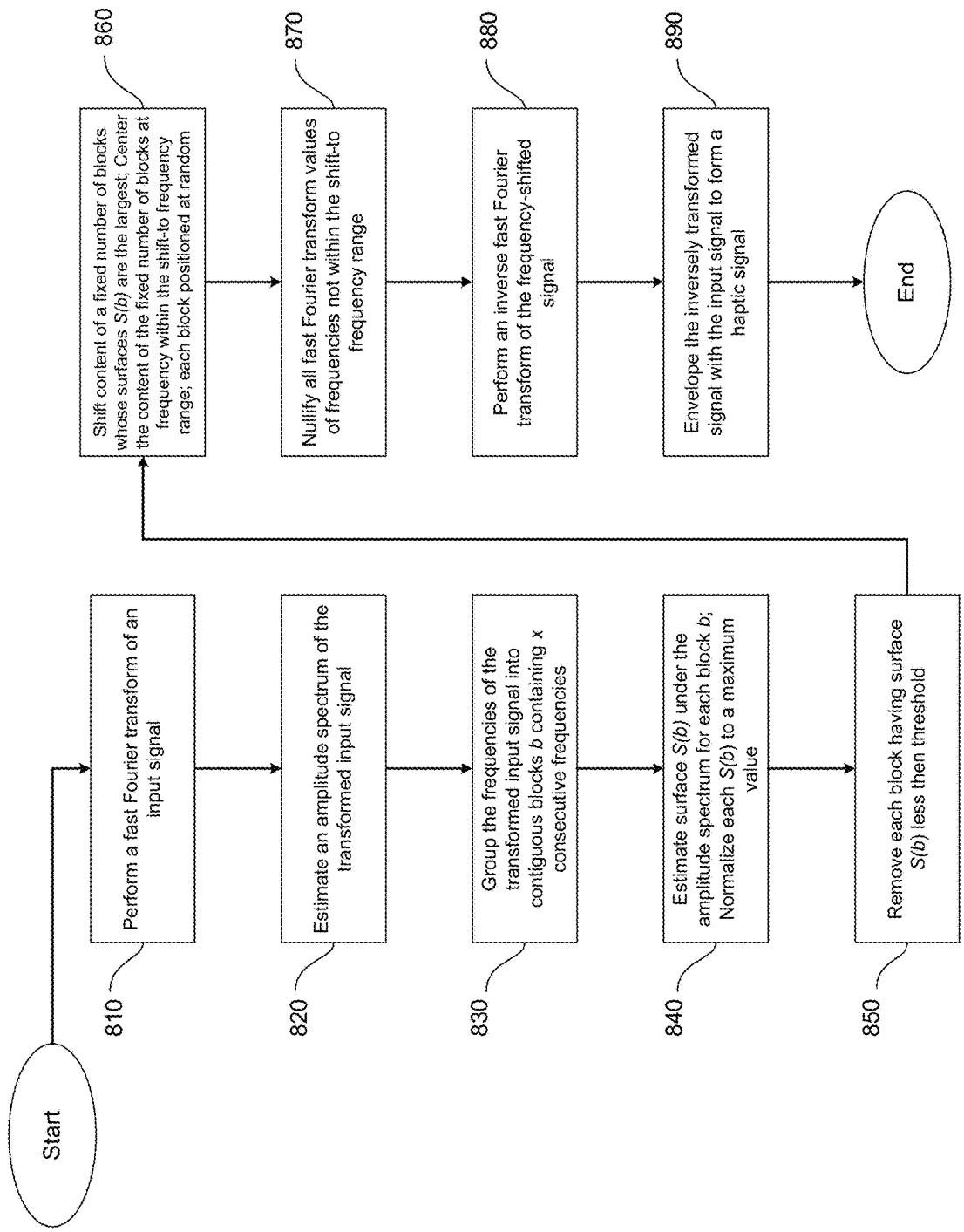

HAPTIC CONVERSION SYSTEM USING FREQUENCY SHIFTING

FIELD

One embodiment is directed generally to a device, and more particularly, to a device that produces haptic effects.

BACKGROUND

Haptics is a tactile and force feedback technology that takes advantage of a user's sense of touch by applying haptic feedback effects (i.e., "haptic effects"), such as forces, vibrations, and motions, to the user. Devices, such as mobile devices, touchscreen devices, and personal computers, can be configured to generate haptic effects. In general, calls to embedded hardware capable of generating haptic effects (such as actuators) can be programmed within an operating system ("OS") of the device. These calls specify which haptic effect to play. For example, when a user interacts with the device using, for example, a button, touchscreen, lever, joystick, wheel, or some other control, the OS of the device can send a play command through control circuitry to the embedded hardware. The embedded hardware then produces the appropriate haptic effect.

Devices can be configured to coordinate the output of haptic effects with the output of other content, such as audio, so that the haptic effects are incorporated into the other content. For example, an audio effect developer can develop audio effects that can be output by the device, such as machine gun fire, explosions, or car crashes. Further, other types of content, such as video effects, can be developed and subsequently output by the device. A haptic effect developer can subsequently author a haptic effect for the device, and the device can be configured to output the haptic effect along with the other content. However, such a process generally requires the individual judgment of the haptic effect developer to author a haptic effect that correctly compliments the audio effect, or other type of content. A poorly-authored haptic effect that does not compliment the audio effect, or other type of content, can produce an overall dissonant effect where the haptic effect does not "mesh" with the audio effect or other content. This type of user experience is generally not desired.

SUMMARY

One embodiment is a system that converts an input into one or more haptic effects using frequency shifting. The system receives an input signal. The system further performs a fast Fourier transform of the input signal. The system further shifts one or more frequencies of the transformed input signal to one or more frequencies within a shift-to frequency range. The system further performs an inverse fast Fourier transform of the frequency-shifted signal, where the inversely transformed signal forms a haptic signal. The system further generates the one or more haptic effects based on the haptic signal.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 8 illustrates a flow diagram of a fifth example method for converting an input signal to a haptic signal, according to an embodiment of the invention.

DETAILED DESCRIPTION

One embodiment is a system that can automatically derive a haptic signal relevant to an input signal. An example of an input signal can be an audio signal, where the audio signal can be a component of a multimedia file, such as an audio file or video file. The derived haptic signal includes frequency content that has been shifted to a range that is compatible with a haptic output device, such as an actuator. Thus, the system can send the derived haptic signal to the haptic output device and generate one or more haptic effects based on the derived haptic signal. Alternatively, the system can store the haptic signal to be played later in a synchronous manner along with other signals. According to the embodiment, the system can utilize a fast Fourier transform of the input signal in order to derive a relevant haptic signal. The system can analyze the frequency content of the input signal, can detect the frequencies with the highest amplitudes (using different approaches and in different manners), and can shift these frequencies (with different techniques) to a frequency range around a resonant frequency of the haptic output device. Different strategies can be utilized to sort and shift the frequency content of the input signal, as is described below in greater detail.

Figure 1:
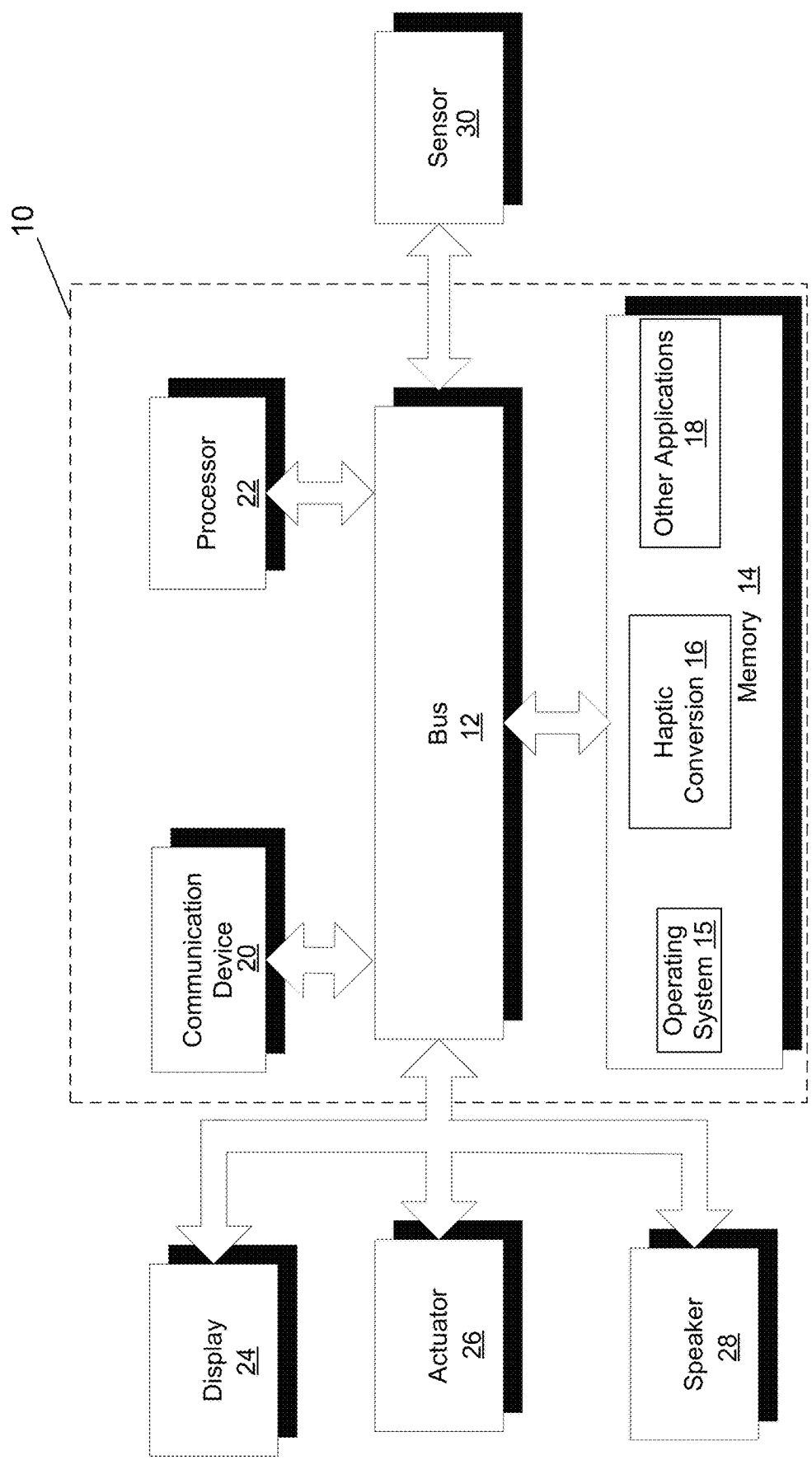
FIG. 1 illustrates a block diagram of a system in accordance with one embodiment of the invention.

FIG. 1 illustrates a block diagram of a system 10 in accordance with one embodiment of the invention. In one embodiment, system 10 is part of a mobile device, and system 10 provides a haptic conversion functionality for the mobile device. In another embodiment, system 10 is part of a wearable device, and system 10 provides a haptic conversion functionality for the wearable device. Examples of wearable devices include wrist bands, headbands, eyeglasses, rings, leg bands, arrays integrated into clothing, or any other type of device that a user may wear on a body or can be held by a user. Some wearable devices can be "haptically enabled," meaning they include mechanisms to generate haptic effects. In another embodiment, system 10 is separate from the device (e.g., a mobile device or a wearable device), and remotely provides the haptic conversion functionality for the device. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer-readable medium.

A computer-readable medium may be any available medium that can be accessed by processor 22 and may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of an information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

In one embodiment, memory 14 stores software modules that provide functionality when executed by processor 22. The modules include an operating system 15 that provides operating system functionality for system 10, as well as the rest of a mobile device in one embodiment. The modules further include a haptic conversion module 16 that converts an input into one or more haptic effects using frequency shifting, as disclosed in more detail below. In certain embodiments, haptic conversion module 16 can comprise a plurality of modules, where each module provides specific individual functionality for converting an input into one or more haptic effects using frequency shifting. System 10 will typically include one or more additional application modules 18 to include additional functionality, such as Integrator™ software by Immersion Corporation.

System 10, in embodiments that transmit and/or receive data from remote sources, further includes a communication device 20, such as a network interface card, to provide mobile wireless network communication, such as infrared, radio, Wi-Fi, or cellular network communication. In other embodiments, communication device 20 provides a wired network connection, such as an Ethernet connection or a modem.

Processor 22 is further coupled via bus 12 to a display 24, such as a Liquid Crystal Display ("LCD"), for displaying a graphical representation or user interface to a user. The display 24 may be a touch-sensitive input device, such as a touch screen, configured to send and receive signals from processor 22, and may be a multi-touch touch screen.

System 10, in one embodiment, further includes an actuator 26. Processor 22 may transmit a haptic signal associated with a generated haptic effect to actuator 26, which in turn outputs haptic effects such as vibrotactile haptic effects, electrostatic friction haptic effects, or deformation haptic effects. Actuator 26 includes an actuator drive circuit. Actuator 26 may be, for example, an electric motor, an electromagnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, an electroactive polymer ("EAP") actuator, an electrostatic friction display, or an ultrasonic vibration generator. In alternate embodiments, system 10 can include one or more additional actuators, in addition to actuator 26 (not illustrated in FIG. 1). Actuator 26 is an example of a haptic output device, where a haptic output device is a device configured to output haptic effects, such as vibrotactile haptic effects, electrostatic friction haptic effects, or deformation haptic effects, in response to a drive signal. In alternate embodiments, actuator 26 can be replaced by some other type of haptic output device. Further, in other alternate embodiments, system 10 may not include actuator 26, and a separate device from system 10 includes an actuator, or other haptic output device, that generates the haptic effects, and system 10 sends generated haptic signals to that device through communication device 20.

System 10, in one embodiment, further includes a speaker 28. Processor 22 may transmit an audio signal to speaker 28, which in turn outputs audio effects. Speaker 28 may be, for example, a dynamic loudspeaker, an electrodynamic loudspeaker, a piezoelectric loudspeaker, a magnetostrictive loudspeaker, an electrostatic loudspeaker, a ribbon and planar magnetic loudspeaker, a bending wave loudspeaker, a flat panel loudspeaker, a heil air motion transducer, a plasma arc speaker, and a digital loudspeaker. In alternate embodiments, system 10 can include one or more additional speakers, in addition to speaker 28 (not illustrated in FIG. 1). Further, in other alternate embodiments, system 10 may not include speaker 28, and a separate device from system 10 includes a speaker that outputs the audio effects, and system 10 sends audio signals to that device through communication device 20.

System 10, in one embodiment, further includes a sensor 30. Sensor 30 can be configured to detect a form of energy, or other physical property, such as, but not limited to, sound, movement, acceleration, bio signals, distance, flow, force/pressure/strain/bend, humidity, linear position, orientation/inclination, radio frequency, rotary position, rotary velocity, manipulation of a switch, temperature, vibration, or visible light intensity. Sensor 30 can further be configured to convert the detected energy, or other physical property, into an electrical signal, or any signal that represents virtual sensor information. Sensor 30 can be any device, such as, but not limited to, an accelerometer, an electrocardiogram, an electroencephalogram, an electromyograph, an electrooculogram, an electropalatograph, a galvanic skin response sensor, a capacitive sensor, a hall effect sensor, an infrared sensor, an ultrasonic sensor, a pressure sensor, a fiber optic sensor, a flexion sensor (or bend sensor), a force-sensitive resistor, a load cell, a LuSense CPS$^2$ 155, a miniature pressure transducer, a piezo sensor, a strain gage, a hygrometer, a linear position touch sensor, a linear potentiometer (or slider), a linear variable differential transformer, a compass, an inclinometer, a magnetic tag (or radio frequency identification tag), a rotary encoder, a rotary potentiometer, a gyroscope, an on-off switch, a temperature sensor (such as a thermometer, thermocouple, resistance temperature detector, thermistor, or temperature-transducing integrated circuit), microphone, photometer, altimeter, bio monitor, camera, or a light-dependent resistor. In alternate embodiments, system 10 can include one or more additional sensors, in addition to sensor 30 (not illustrated in FIG. 1). In some of these embodiments, sensor 30 and the one or more additional sensors may be part of a sensor array, or some other type of collection of sensors. Further, in other alternate embodiments, system 10 may not include sensor 30, and a separate device from system 10 includes a sensor that detects a form of energy, or other physical property, and converts the detected energy, or other physical property, into an electrical signal, or other type of signal that represents virtual sensor information. The device can then send the converted signal to system 10 through communication device 20.

Figure 2:
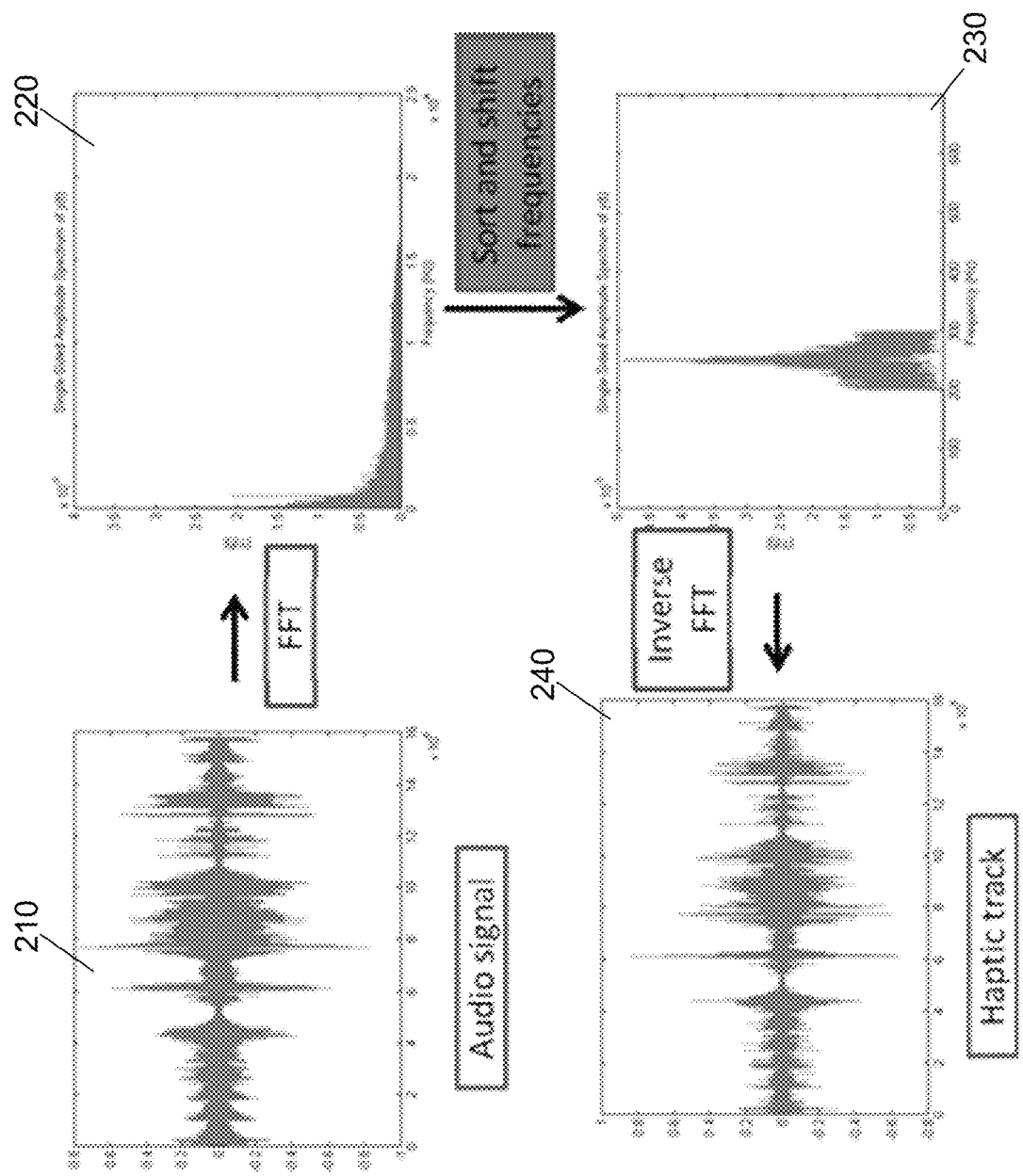
FIG. 2 illustrates a frequency shifting of a plurality of frequencies of an input signal, where the frequency shifting is used to convert the input signal into a haptic signal, according to an embodiment of the invention.

FIG. 2 illustrates a frequency shifting of a plurality of frequencies of an input signal, where the frequency shifting is used to convert the input signal into a haptic signal, according to an embodiment of the invention. FIG. 2 illustrates graph 210, which is a representation of an audio signal, which is a type of input signal. In alternate embodiments, the audio signal can be replaced by another type of input signal, such as a video signal, an acceleration signal, an orientation signal, an ambient light signal, or another type of signal that can include data captured with a sensor.

According to the embodiment, a fast Fourier transform can be performed on the audio signal, where the transformed audio signal is represented by graph 220. A fast Fourier transform is a mapping of a signal, or other function, that is defined in one domain, such as space or time, into another domain, such as wavelength or frequency.

Subsequently, one or more frequencies of the transformed audio signal can be sorted and shifted according to one of a number of frequency-shifting methods, where the frequency-shifted audio signal is represented by graph 230. More specifically, the frequencies of the transformed signal are sorted by a characteristic (such as amplitude), one, some, or all of the sorted frequencies of the transformed signal are selected, and the selected frequencies of the transformed signal are shifted from an existing frequency to a frequency within a "shift-to" frequency range.

Example techniques for sorting and shifting frequencies are further described below as part of example methods for converting an input signal to a haptic signal, in conjunction with FIGS. 4, 5, 6, 7, and 8. However, one of ordinary skill in the relevant art will appreciate that the example frequency-shifting techniques described below are only example frequency-shifting techniques according to example embodiments, and that, in alternate embodiments, frequencies of the transformed audio signal can be sorted and shifted according to other alternate frequency-shifting techniques. Further, the example techniques described below can be used to produce a unique set of haptic effects, where the set of haptic effects will give off a different "feeling" based on the frequency-shifting technique that is selected. Additionally, the frequency-shifting technique that is used may be pre-defined by the system, or may be customized by a system administrator, a haptic effects developer, a user, or some other individual.

According to the embodiment, an inverse fast Fourier transform can be performed on the frequency-shifted audio signal, where the inversely transformed audio signal is represented by graph 240. A haptic signal can subsequently be formed based on the inversely transformed audio signal. The haptic signal can subsequently be sent to a haptic output device, such as an actuator, where the haptic signal is used by the haptic output device to output one or more haptic effects. Alternatively, the haptic signal can be stored in a storage medium, such as a RAM, flash memory, ROM, EPROM, EEPROM, register, hard disk, removable disk, CD-ROM, or any other form of a storage medium. The haptic signal can subsequently be retrieved from the storage medium and sent to the haptic output device, so that the haptic output device can output one or more haptic effects based on the haptic signal.

Figure 3:
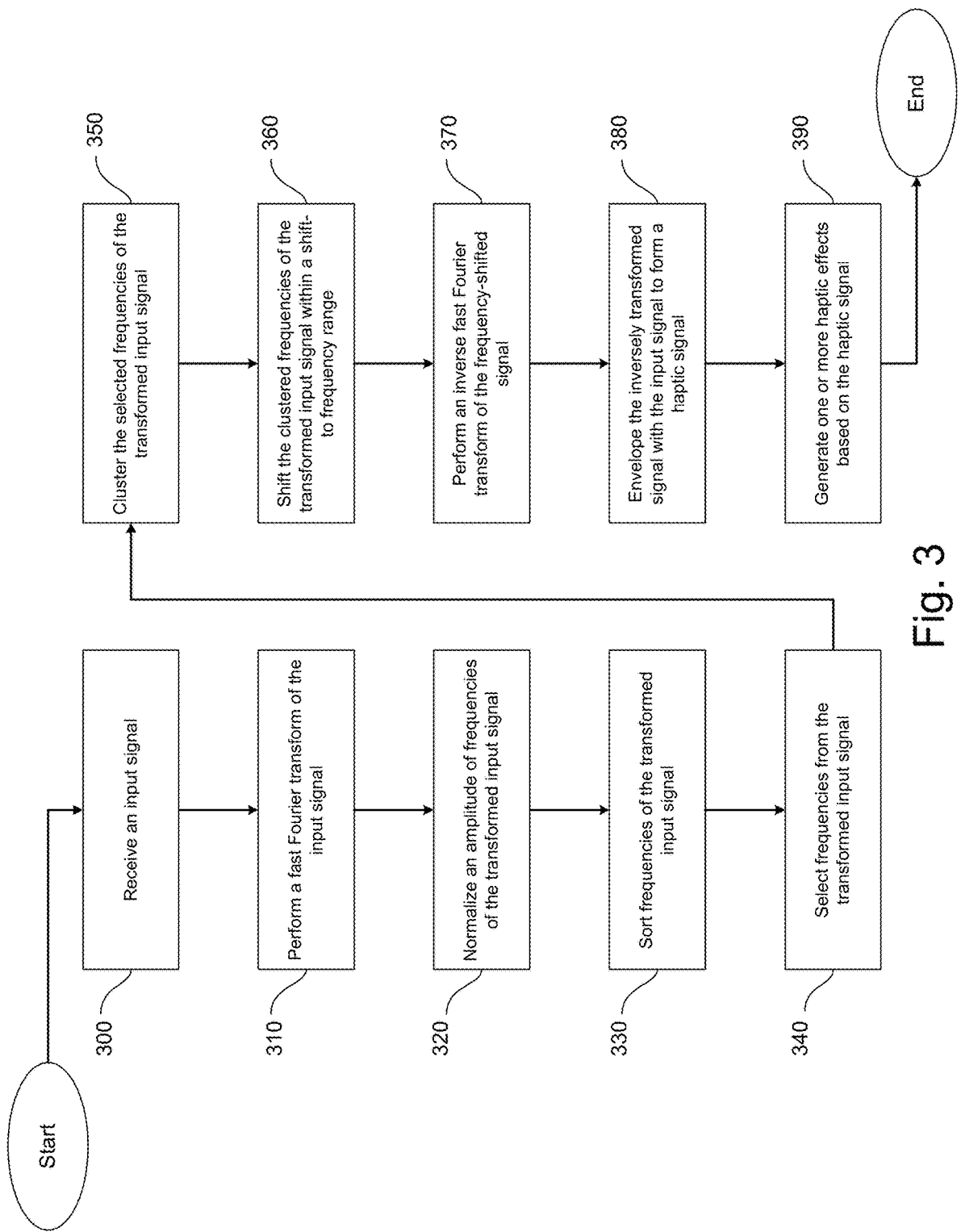
FIG. 3 illustrates a flow diagram of the functionality of a haptic conversion module, according to an embodiment of the invention.

FIG. 3 illustrates a flow diagram of the functionality of a haptic conversion module (such as haptic conversion module 16 of FIG. 1), according to one embodiment of the invention. In one embodiment, the functionality of FIG. 3, as well as the functionality of FIGS. 4, 5, 6, 7, and 8, are each implemented by software stored in memory or other computer-readable or tangible media, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

The flow begins and proceeds to 300. At 300, an input signal is received. In certain embodiments, the input signal can be an audio signal. In other embodiments, the input signal can be a video signal. In other embodiments, the input signal can be an acceleration signal. The flow then proceeds to 310.

At 310, a fast Fourier transform is performed on the input signal. The flow then proceeds to 320.

At 320, an amplitude of a plurality of frequencies of the transformed input signal is normalized. In certain embodiments, the Fast Fourier transform of the input signal results in two vectors: one vector containing frequencies, and another vector containing magnitudes corresponding to those frequencies. A maximum value among all the magnitudes can be found, and the maximum value can be used to normalize all the magnitudes, thus, resulting in a magnitude vector with a value smaller than 1. In other words, the vector containing the magnitudes can be normalized to 1. In certain embodiments, 320 can be omitted. The flow then proceeds to 330.

At 330, the frequencies of the transformed input signal are sorted. The frequencies can be sorted based on a characteristic of the frequencies. In certain embodiments, the frequencies of the transformed input signal can be sorted according to a sorting technique that is part of one of the example methods for converting an input signal to a haptic signal, described below in further detail in conjunction with FIGS. 4, 5, 6, 7, and 8. In certain embodiments, 330 can be omitted. The flow then proceeds to 340.

At 340, one or more frequencies are selected from the frequencies of the transformed input signal. One, some, or all the frequencies of the transformed input signal can be selected. In certain embodiments, the frequencies of the transformed input signal can be selected according to a selection technique that is part of one of the example methods for converting an input signal to a haptic signal, described below in further detail in conjunction with FIGS. 4, 5, 6, 7, and 8. In certain embodiments, 340 can be omitted. The flow then proceeds to 350.

At 350, the selected frequencies of the transformed input signal are clustered. By clustering, the selected frequencies can be reduced into a fewer number of frequencies. In certain embodiments, the selected frequencies of the transformed input signal can be clustered according to a clustering technique that is part of one of the example methods for converting an input signal to a haptic signal, described below in further detail in conjunction with FIGS. 4, 5, 6, 7, and 8. Additionally, in certain embodiments, 350 can be omitted. The flow then proceeds to 360.

At 360, the clustered frequencies of the transformed input signal are shifted within a "shift-to" frequency range. By shifting, each clustered frequency is moved from its original frequency (i.e., a "shift-from" frequency) to a new frequency (i.e., a "shift-to" frequency). In certain embodiments, the clustered frequencies of the transformed input signal can be shifted according to a frequency-shifting technique that is part of one of the example methods for converting an input signal to a haptic signal, described below in further detail in conjunction with FIGS. 4, 5, 6, 7, and 8. Also, in certain embodiments, a haptic signal is formed based on the resulting frequency-shifted signal. The flow then proceeds to 370.

At 370, an inverse fast Fourier transform is performed on the frequency-shifted signal. In certain embodiments, a haptic signal is formed based on the resulting inversely transformed signal. The flow then proceeds to 380.

At 380, the inversely transformed signal is enveloped with the original input signal. This can be a one-to-one point (sample) multiplication between the original input signal and the inversely transformed signal. Another way of enveloping is to extract the envelope of the original input signal and multiply the inversely transformed signal by this envelope. Alternatively, the inversely transformed signal is not enveloped and is used as is, or in other words, can be multiplied by an envelope with a constant magnitude of 1. In certain embodiments, a haptic signal is formed based on the resulting enveloped signal. In alternate embodiments, 380 can be omitted. The flow then proceeds to 390.

At 390, one or more haptic effects are generated based on the haptic signal. In some embodiments, the haptic signal can be sent to a haptic output device, such as actuator 26 of FIG. 1, to generate the one or more haptic effects. The flow then ends.

Figure 4:
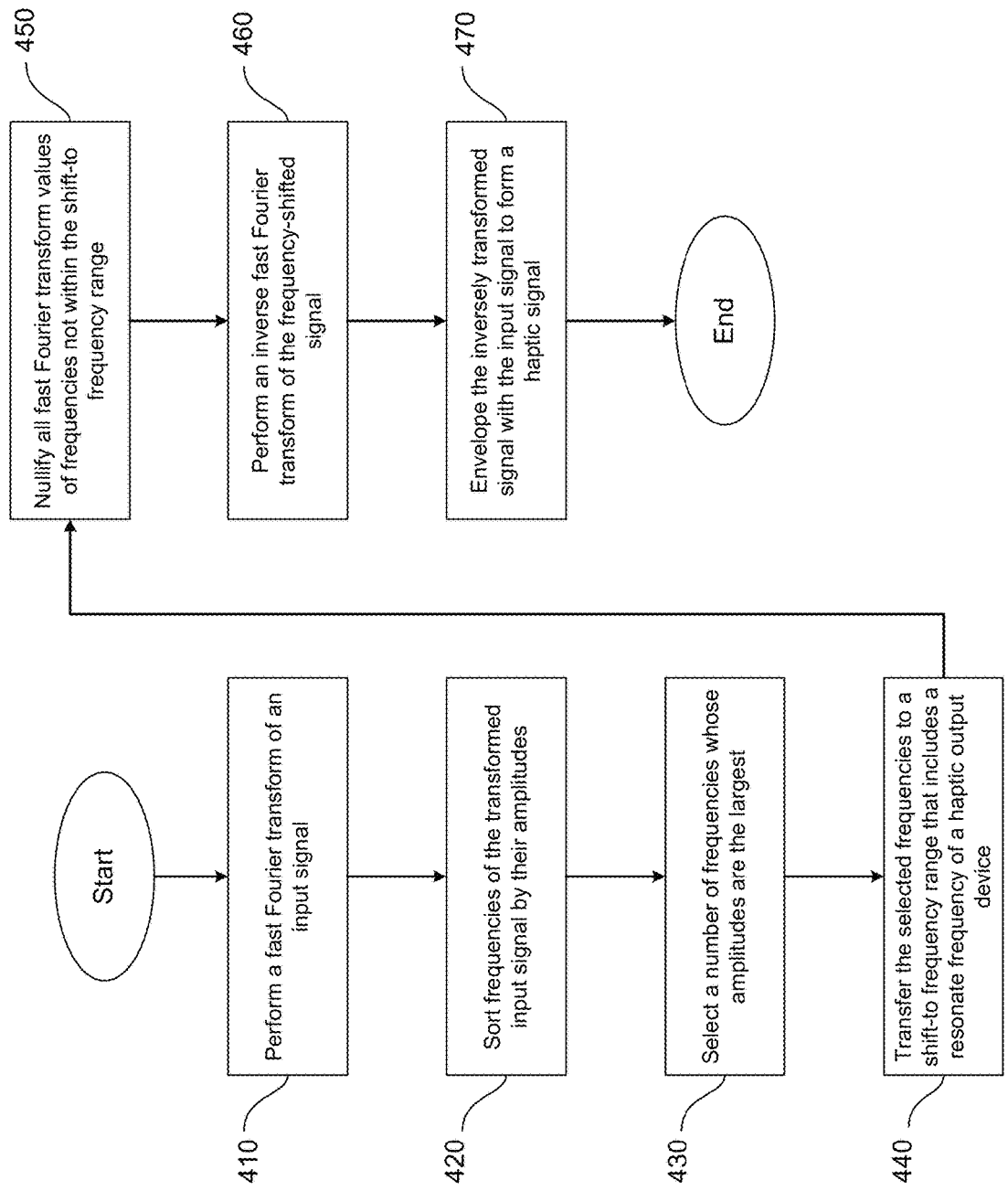
FIG. 4 illustrates a flow diagram of a first example method for converting an input signal to a haptic signal, according to an embodiment of the invention.

FIG. 4 illustrates a flow diagram of a first example method for converting an input signal to a haptic signal, according to an embodiment of the invention. The flow begins and proceeds to 410. At 410, a fast Fourier transform is performed on an input signal, such as an audio signal, a video signal, an acceleration signal, or any other signal that can include data captured with a sensor. The flow then proceeds to 420.

At 420, the frequencies of the transformed input signal are sorted by their amplitude. The flow then proceeds to 430.

At 430, a pre-determined number of frequencies whose amplitudes are the largest are selected from the frequencies of the transformed input signal. The pre-determined number of frequencies can be equal to a width of a pre-determined frequency range. The pre-determined frequency range can be a "shift-to" frequency range. The flow then proceeds to 440.

At 440, the selected frequencies are transferred to the shift-to frequency range. In certain embodiments, the shift-to frequency range can include a resonant frequency of a haptic output device. In some of those embodiments, the haptic output device can be an actuator. Further, in certain embodiments, the selected frequencies can be transferred by assigning an amplitude (derived from a fast Fourier transform value) of each selected frequency to a frequency within the shift-to frequency range. The flow then proceeds to 450.

At 450, all fast Fourier transform values of frequencies not within the shift-to frequency range are nullified. The flow then proceeds to 460.

At 460, an inverse fast Fourier transform of the frequency-shifted signal is performed. The flow then proceeds to 470.

At 470, the inversely transformed signal is enveloped with the original input signal to form a haptic signal. This can be a one-to-one point (sample) multiplication between the original input signal and the inversely transformed signal. Another way of enveloping is to extract the envelope of the original input signal and multiply the inversely transformed signal by this envelope. Alternatively, the inversely transformed signal is not enveloped and is used as is, or in other words, can be multiplied by an envelope with a constant magnitude of 1. The flow then ends.

Figure 5:
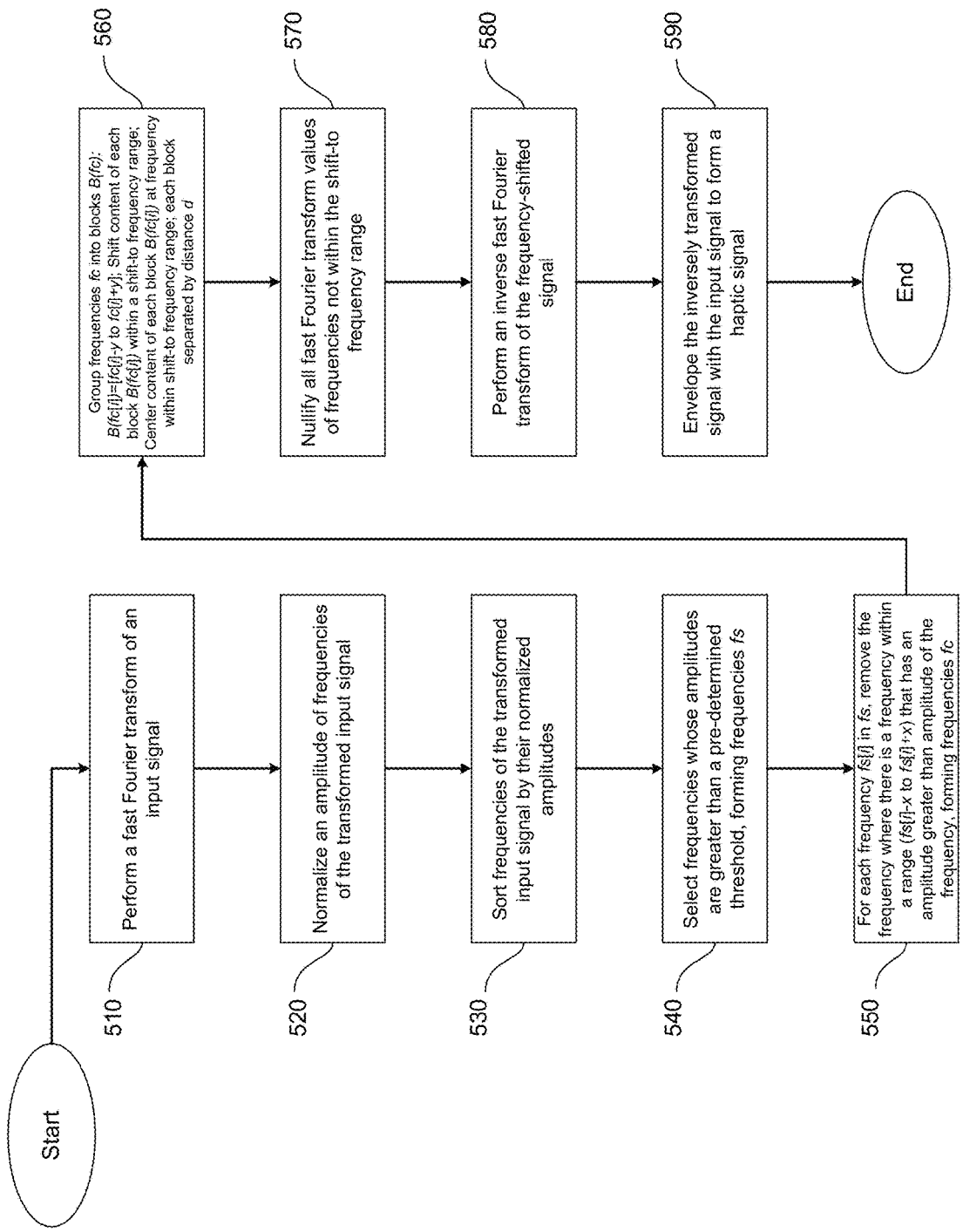
FIG. 5 illustrates a flow diagram of a second example method for converting an input signal to a haptic signal, according to an embodiment of the invention.

FIG. 5 illustrates a flow diagram of a second example method for converting an input signal to a haptic signal, according to an embodiment of the invention. The flow begins and proceeds to 510. At 510, a fast Fourier transform is performed on an input signal, such as an audio signal, a video signal, an acceleration signal, or any other signal that can include data captured with a sensor. The flow then proceeds to 520.

At 520, an amplitude of the frequencies of the transformed input signal is normalized. In certain embodiments, the Fast Fourier transform of the input signal results in two vectors: one vector containing frequencies, and another vector containing magnitudes corresponding to those frequencies. A maximum value among all the magnitudes can be found, and the maximum value can be used to normalize all the magnitudes, thus, resulting in a magnitude vector with a value smaller than 1. In other words, the vector containing the magnitudes can be normalized to 1. The flow then proceeds to 530.

At 530, the frequencies of the transformed input signal are sorted by their normalized amplitudes. The flow then proceeds to 540.

At 540, one or more frequencies whose amplitudes are greater than a pre-determined threshold (e.g., 0.1) are selected from the frequencies of the transformed input signal. The selected frequencies can be identified as frequencies "fs," and the other frequencies can be ignored. The flow then proceeds to 550.

At 550, the surviving frequencies fs are clustered as follows. For each frequency "fs[i]" in fs, starting with frequency fs[i] having the largest amplitude, frequency fs[i+1] having the second largest amplitude, etc., all the frequencies in the range [fs[i]−x Hz to fs[i]+x Hz] (e.g., x=1) are considered. If there is a frequency within this range that has an amplitude greater than the frequency fs[i], then frequency fs[i] is removed. By applying this clustering technique, only frequencies that are distant by more than x Hz are present. These surviving frequencies can be identified as frequencies "fc." The flow then proceeds to 560.

At 560, the surviving frequencies fc are grouped into one or more blocks B(fc), where, for each frequency "fc[i]" in fc, B(fc[i])=[fc[i]−y Hz to fc[i]+y Hz], and where y is equal to a number that is smaller than a width of a pre-determined frequency range. The pre-determined frequency range can be a "shift-to" frequency range. Frequency content of each block B(fc[i]) is then shifted to, and centered at, a frequency in the shift-to frequency range (e.g., 200 to 300 Hz for an actuator with a 250 Hz resonant frequency). The blocks B(fc) can be separated by a pre-determined distance d within the shift-to frequency range (e.g., d=1 Hz) in order to make the content shifted from different frequencies feel different. For example, a first block corresponding to the frequency with the largest amplitude can be shifted to, and centered at, 250 Hz, a second block corresponding to the frequency with the second largest amplitude can be shifted to, and centered at, 248 Hz, a third block corresponding to the frequency with the third largest amplitude can be shifted to, and centered at, 252 Hz, etc., until the lower limits and the upper limits of the shift-to frequency range (e.g., 200 Hz to 300 Hz) are reached. In certain embodiments, one or more frequencies of the frequency content of each block can be shifted by assigning an amplitude (derived from a fast Fourier transform value) of each frequency to a frequency within the shift-to frequency range. The flow then proceeds to 570.

At 570, all fast Fourier transform values of frequencies not within the shift-to frequency range are nullified. The flow then proceeds to 580.

At 580, an inverse fast Fourier transform of the frequency-shifted signal is performed. The flow then proceeds to 590.

At 590, the inversely transformed signal is enveloped with the original input signal to form a haptic signal. This can be a one-to-one point (sample) multiplication between the original input signal and the inversely transformed signal. Another way of enveloping is to extract the envelope of the original input signal and multiply the inversely transformed signal by this envelope. Alternatively, the inversely transformed signal is not enveloped and is used as is, or in other words, can be multiplied by an envelope with a constant magnitude of 1. The enveloped signal can have an envelope that is close to that of the original input signal, and can be used as a haptic signal. The flow then ends.

Figure 6:
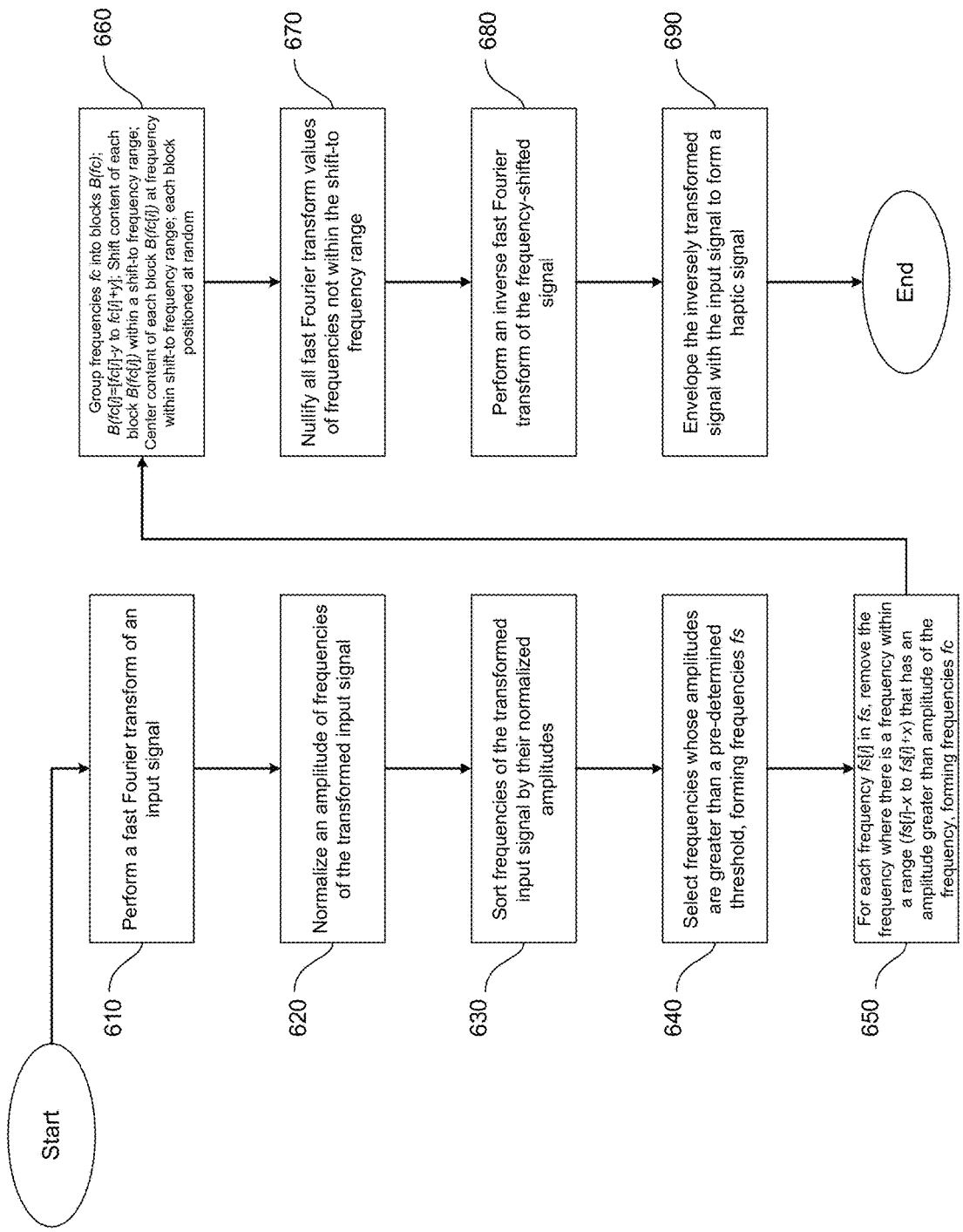
FIG. 6 illustrates a flow diagram of a third example method for converting an input signal to a haptic signal, according to an embodiment of the invention.

FIG. 6 illustrates a flow diagram of a third example method for converting an input signal to a haptic signal, according to an embodiment of the invention. The flow begins and proceeds to 610. At 610, a fast Fourier transform is performed on an input signal, such as an audio signal, a video signal, an acceleration signal, or any other signal that can include data captured with a sensor. The flow then proceeds to 620.

At 620, an amplitude of the frequencies of the transformed input signal is normalized. In certain embodiments, the Fast Fourier transform of the input signal results in two vectors: one vector containing frequencies, and another vector containing magnitudes corresponding to those frequencies. A maximum value among all the magnitudes can be found, and the maximum value can be used to normalize all the magnitudes, thus, resulting in a magnitude vector with a value smaller than 1. In other words, the vector containing the magnitudes can be normalized to 1. The flow then proceeds to 630.

At 630, the frequencies of the transformed input signal are sorted by their normalized amplitudes. The flow then proceeds to 640.

At 640, one or more frequencies whose amplitudes are greater than a pre-determined threshold (e.g., 0.1) are selected from the frequencies of the transformed input signal. The selected frequencies can be identified as frequencies "fs," and the other frequencies can be ignored. The flow then proceeds to 650.

At 650, the surviving frequencies fs are clustered as follows. For each frequency "fs[i]" in fs, starting with frequency fs[i] having the largest amplitude, frequency fs[i+1] having the second largest amplitude, etc., all the frequencies in the range [fs[i]−x Hz to fs[i]+x Hz] (e.g., x=1) are considered. If there is a frequency within this range that has an amplitude greater than the frequency fs[i], then frequency fs[i] is removed. By applying this clustering technique, only frequencies that are distant by more than x Hz are present. These surviving frequencies can be identified as frequencies "fc." The flow then proceeds to 660.

At 660, the surviving frequencies fc are grouped into one or more blocks B(fc), where, for each frequency "fc[i]" in fc, B(fc[i])=[fc[i]−y Hz to fc[i]+y Hz], and where y is equal to a number that is smaller than a width of a pre-determined frequency range. The pre-determined frequency range can be a "shift-to" frequency range. Frequency content of each block B(fc[i]) is then shifted to, and centered at, a frequency in the shift-to frequency range (e.g., 200 to 300 Hz for an actuator with a 250 Hz resonant frequency). The choice of the positions of the frequencies in the shift-to frequency range can be random. In certain embodiments, one or more frequencies of the frequency content of each block can be shifted by assigning an amplitude (derived from a fast Fourier transform value) of each frequency to a frequency within the shift-to frequency range. The flow then proceeds to 670.

At 670, all fast Fourier transform values of frequencies not within the shift-to frequency range are nullified. The flow then proceeds to 680.

At 680, an inverse fast Fourier transform of the frequency-shifted signal is performed. The flow then proceeds to 690.

At 690, the inversely transformed signal is enveloped with the original input signal to form a haptic signal. This can be a one-to-one point (sample) multiplication between the original input signal and the inversely transformed signal. Another way of enveloping is to extract the envelope of the original input signal and multiply the inversely transformed signal by this envelope. Alternatively, the inversely transformed signal is not enveloped and is used as is, or in other words, can be multiplied by an envelope with a constant magnitude of 1. The enveloped signal can have an envelope that is close to that of the original input signal, and can be used as a haptic signal. The flow then ends.

Figure 7:
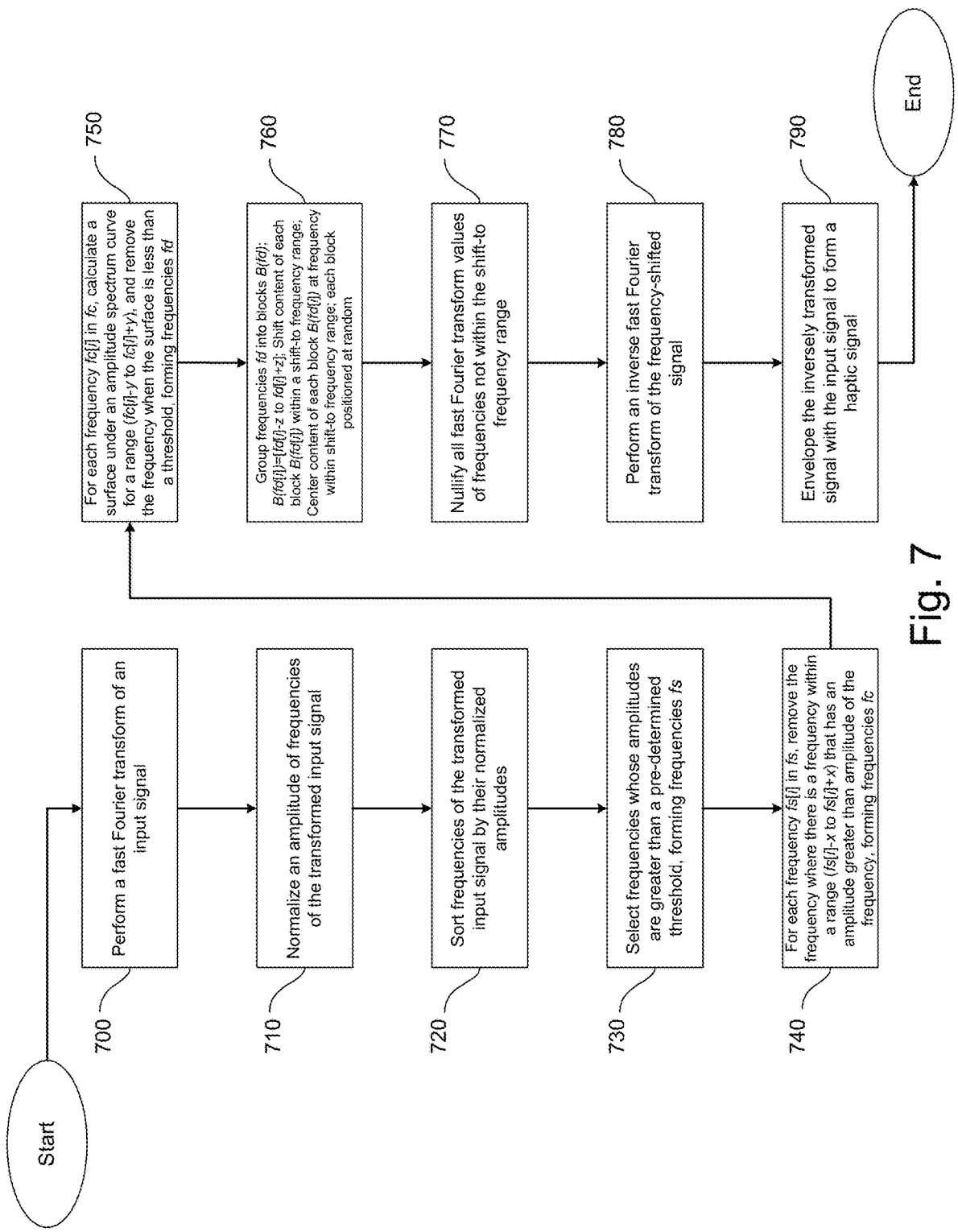
FIG. 7 illustrates a flow diagram of a fourth example method for converting an input signal to a haptic signal, according to an embodiment of the invention.

FIG. 7 illustrates a flow diagram of a fourth example method for converting an input signal to a haptic signal, according to an embodiment of the invention. The flow begins and proceeds to 700. At 700, a fast Fourier transform is performed on an input signal, such as an audio signal, a video signal, an acceleration signal, or any other signal that can include data captured with a sensor. The flow then proceeds to 710.

At 710, an amplitude of the frequencies of the transformed input signal is normalized. In certain embodiments, the Fast Fourier transform of the input signal results in two vectors: one vector containing frequencies, and another vector containing magnitudes corresponding to those frequencies. A maximum value among all the magnitudes can be found, and the maximum value can be used to normalize all the magnitudes, thus, resulting in a magnitude vector with a value smaller than 1. In other words, the vector containing the magnitudes can be normalized to 1. The flow then proceeds to 720.

At 720, the frequencies of the transformed input signal are sorted by their normalized amplitudes. The flow then proceeds to 730.

At 730, one or more frequencies whose amplitudes are greater than a pre-determined threshold (e.g., 0.1) are selected from the frequencies of the transformed input signal. The selected frequencies can be identified as frequencies "fs," and the other frequencies can be ignored. The flow then proceeds to 740.

At 740, the surviving frequencies fs are clustered as follows. For each frequency "fs[i]" in fs, starting with frequency fs[i] having the largest amplitude, frequency fs[i+1] having the second largest amplitude, etc., all the frequencies in the range [fs[i]−x Hz to fs[i]+x Hz] (e.g., x=1) are considered. If there is a frequency within this range that has an amplitude greater than the frequency fs[i], then frequency fs[i] is removed. By applying this clustering technique, only frequencies that are distant by more than x Hz are present. These surviving frequencies can be identified as frequencies "fc." The flow then proceeds to 750.

At 750, the surviving frequencies fc are clustered as follows. For each frequency "fc[i]" in fc, a surface under an amplitude spectrum curve for a range [fc[i]−y Hz to fc[i]+y Hz] is calculated. If the surface is greater than a pre-determined threshold, then frequency fc[i] is kept. Otherwise, frequency fc[i] is removed. The surviving frequencies can be identified as frequencies "fd." The flow then proceeds to 760.

At 760, the surviving frequencies fd are grouped into one or more blocks B(fd), where, for each frequency "fd[i]" in fd, B(fd[i])=[fd[i]−z Hz to fd[i]+z Hz], and where z is equal to a number that is smaller than a width of a pre-determined frequency range. The pre-determined frequency range can be a "shift-to" frequency range. Frequency content of each block B(fd[i]) is then shifted to, and centered at, a frequency in the shift-to frequency range (e.g., 200 to 300 Hz for an actuator with a 250 Hz resonant frequency). The choice of the positions of the frequencies in the shift-to frequency range can be random. In certain embodiments, one or more frequencies of the frequency content of each block can be shifted by assigning an amplitude (derived from a fast Fourier transform value) of each frequency to a frequency within the shift-to frequency range. The flow then proceeds to 770.

At 770, all fast Fourier transform values of frequencies not within the shift-to frequency range are nullified. The flow then proceeds to 780.

At 780, an inverse fast Fourier transform of the frequency-shifted signal is performed. The flow then proceeds to 790.

At 790, the inversely transformed signal is enveloped with the original input signal to form a haptic signal. This can be a one-to-one point (sample) multiplication between the original input signal and the inversely transformed signal. Another way of enveloping is to extract the envelope of the original input signal and multiply the inversely transformed signal by this envelope. Alternatively, the inversely transformed signal is not enveloped and is used as is, or in other words, can be multiplied by an envelope with a constant magnitude of 1. The enveloped signal can have an envelope that is close to that of the original input signal, and can be used as a haptic signal. The flow then ends.

FIG. 8 illustrates a flow diagram of a fifth example method for converting an input signal to a haptic signal, according to an embodiment of the invention. At 810, a fast Fourier transform is performed on an input signal, such as an audio signal, a video signal, an acceleration signal, or any other signal that can include data captured with a sensor. The flow then proceeds to 820.

At 820, an amplitude spectrum of the transformed input signal is estimated. The flow then proceeds to 830.

At 830, the frequencies of the transformed input signal are grouped into contiguous blocks b, where each block contains x consecutive frequencies. The flow then proceeds to 840.

At 840, a surface (identified as surface S(b)) under the amplitude spectrum is estimated for each block b, and each surface S(b) is normalized to 1 using the maximum value of all surfaces S. The flow then proceeds to 850.

At 850, each block b having a surface S(b) less than a pre-determined threshold is removed. The flow then proceeds to 860.

At 860, the frequency content of one or more blocks whose surfaces are the largest is shifted and centered to a random position within a "shift-to" frequency range. The flow then proceeds to 870.

At 870, all fast Fourier transform values of frequencies not within the shift-to frequency range are nullified. The flow then proceeds to 880.

At 880, an inverse fast Fourier transform of the frequency-shifted signal is performed. The flow then proceeds to 890.

At 890, the inversely transformed signal is enveloped with the original input signal to form a haptic signal. This can be a one-to-one point (sample) multiplication between the original input signal and the inversely transformed signal. Another way of enveloping is to extract the envelope of the original input signal and multiply the inversely transformed signal by this envelope. Alternatively, the inversely transformed signal is not enveloped and is used as is, or in other words, can be multiplied by an envelope with a constant magnitude of 1. The enveloped signal can have an envelope that is close to that of the original input signal, and can be used as a haptic signal. The flow then ends.

Thus, in one embodiment, a system can create a haptic signal from an input signal, such as an audio signal, video signal, or acceleration signal, using frequency-shifting. The system can, thus, convert input data, such as audio data, video data, or acceleration data, to haptic effects without requiring any filtering of an input signal. Thus, any and all content of the input signal can be used to generate the haptic signal.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to convert an input into one or more haptic effects using frequency shifting, the converting comprising:

receiving an input signal that comprises one of an audio signal, a video signal, or an acceleration signal;

performing a Fourier transform of the input signal to generate a transformed input signal that identifies frequency content of the input signal, the frequency content including a plurality of frequencies;

sorting the plurality of frequencies of the transformed input signal by an amplitude to generate sorted frequencies;

selecting, after performing the Fourier transform, a plurality of the sorted frequencies of the transformed input signal according to the sorted frequencies having a largest amplitude to determine selected frequencies;

shifting the selected frequencies of the transformed input signal from their existing frequencies to one or more frequencies within a shift-to frequency range to generate a frequency-shifted signal;

performing an inverse Fourier transform of the frequency-shifted signal to generate a haptic signal; and generating the one or more haptic effects based on the haptic signal.

2. The non-transitory computer-readable medium of claim 1, wherein converting further comprises:

clustering the selected frequencies of the transformed input signal.

3. The non-transitory computer-readable medium of claim 2, wherein converting further comprises:

normalizing amplitudes of the plurality of frequencies identified in the transformed input signal.

4. The non-transitory computer-readable medium of claim 1, wherein shifting the selected i frequencies of the transformed input signal further comprises transferring the selected frequencies to the shift-to frequency range, wherein the shift-to frequency range comprises a resonant frequency of a haptic output device.

5. The non-transitory computer-readable medium of claim 4, wherein transferring the selected frequencies of the transformed input signal further comprises:

assigning an amplitude that is derived from a Fourier transform value of each selected frequency to a frequency within the shift-to frequency range; and nullifying all Fourier transform values of frequencies not within the shift-to frequency range.

6. The non-transitory computer-readable medium of claim 5, wherein converting further comprises:

enveloping the inversely transformed signal with the input signal, wherein the enveloped signal forms the haptic signal.

7. The non-transitory computer-readable medium of claim 3, wherein sorting the plurality of frequencies identified in the transformed input signal further comprises sorting the plurality of frequencies by their normalized amplitudes;

wherein selecting the plurality of sorted frequencies of the transformed input signal further comprises selecting the plurality of sorted frequencies whose amplitudes are greater than a pre-determined threshold;

wherein clustering the selected frequencies of the transformed input signal further comprises, for the selected frequencies, removing the selected frequency where there is another frequency within a first pre-determined range that has an amplitude greater than the amplitude of the selected frequency to generate clustered frequencies; and wherein shifting the selected frequencies of the transformed input signal further comprises grouping the clustered frequencies within one or more blocks to create groups of frequencies, wherein a width of each block is a width of a second pre-determined range that is smaller than a width of the shift-to frequency range, and comprises shifting the frequency content of each block within the shift-to frequency range to create shifted frequency content, and comprises centering the shifted frequency content of each block at a frequency within the shift-to frequency range.

8. The non-transitory computer-readable medium of claim 7, wherein shifting the frequency content of each block at a frequency within the shift-to frequency range further comprises:

assigning Fourier transform values of each group of frequencies to frequencies within the shift-to frequency range; and nullifying all Fourier transform values of frequencies not within the shift-to frequency range.

9. The non-transitory computer-readable medium of claim 8, the converting further comprising:

enveloping the inversely transformed signal with the input signal, wherein the enveloped input signal forms the haptic signal.

10. The non-transitory computer-readable medium of claim 7, wherein each block is separated from another block by a pre-determined distance within the shift-to frequency range.

11. The non-transitory computer-readable medium of claim 7, wherein each block is positioned within the shift-to frequency range at a random position.

12. The non-transitory computer-readable medium of claim 11, wherein clustering the selected frequencies of the transformed input signal further comprises, for each clustered frequency, calculating a surface under an amplitude spectrum curve for a third pre-determined range, and removing the clustered frequencies where the surface is less than a pre-determined threshold.

13. The non-transitory computer-readable medium of claim 1, further comprising:

estimating an amplitude spectrum of the transformed input signal;

wherein sorting the plurality of frequencies of the transformed input signal further comprises grouping the plurality of frequencies into a plurality of contiguous blocks, wherein each block comprises one or more contiguous frequencies;

wherein selecting the plurality of sorted frequencies of the transformed input signal further comprises estimating a surface under an amplitude spectrum for each block, normalizing the surface of each block to a maximum value, and removing each block whose surface is less than a pre-determined threshold;

wherein shifting the selected frequencies of the transformed input signal further comprises shifting the frequency content of one or more shifted blocks of the blocks whose surfaces are the largest within the shift-to frequency range, and centering the shifted frequency content of the one or more shifted blocks at a frequency within the shift-to frequency range.

14. The non-transitory computer-readable medium of claim 13, wherein shifting the frequency content of one or more shifted blocks whose surfaces are the largest at a frequency within the shift-to frequency range further comprises:

assigning a Fourier transform value of each group of frequencies to a value within the shift-to frequency range; and nullifying all Fourier transform values of frequencies not within the shift-to frequency range.

15. The non-transitory computer-readable medium of claim 14, wherein converting further comprises:

enveloping the inversely transformed signal with the input signal, wherein the enveloped signal forms the haptic signal.

16. The non-transitory computer-readable medium of claim 13, wherein each block is positioned within the shift-to frequency range at a random position.

17. The non-transitory computer-readable medium of claim 1, wherein generating the one or more haptic effects further comprises sending the haptic signal to a haptic output device to generate the one or more haptic effects.

18. The non-transitory computer-readable medium of claim 17, wherein the haptic output device comprises an actuator.

19. A computer-implemented method for converting an input into one or more haptic effects using frequency shifting, the computer-implemented method comprising:
receiving an input signal that comprises one of an audio signal, a video signal, or an acceleration signal;
performing a Fourier transform of the input signal to generate a transformed input signal that identifies frequency content of the input signal, the frequency content including a plurality of frequencies;
sorting the plurality of frequencies of the transformed input signal by an amplitude to generate sorted frequencies;
selecting, after performing the Fourier transform, a plurality of the sorted frequencies of the transformed input signal according to the sorted frequencies having a largest amplitude to determine selected frequencies;
shifting the selected frequencies of the transformed input signal from their existing frequencies to one or more frequencies within a shift-to frequency range to generate a frequency-shifted signal;
performing an inverse Fourier transform of the frequency-shifted signal to generate a haptic signal; and
generating the one or more haptic effects based on the haptic signal.

20. The computer-implemented method of claim 19, further comprising:
clustering the selected frequencies of the transformed input signal.

21. The computer-implemented method of claim 19, wherein shifting the selected frequencies of the transformed input signal further comprises transferring the selected frequencies to the shift-to frequency range, wherein the shift-to frequency range comprises a resonant frequency of a haptic output device.

22. The computer-implemented method of claim 20, wherein sorting the plurality of frequencies identified in the transformed input signal further comprises sorting the plurality of frequencies by their normalized amplitudes;
wherein selecting the plurality of sorted frequencies of the transformed input signal further comprises selecting the plurality of sorted frequencies whose amplitudes are greater than a pre-determined threshold;
wherein clustering the selected frequencies of the transformed input signal further comprises, for each frequency of the selected frequencies, removing the selected frequency where there is another frequency within a first pre-determined range that has an amplitude greater than the amplitude of the selected frequency to generate clustered frequencies; and
wherein shifting the selected frequencies of the transformed input signal further comprises grouping the clustered frequencies within one or more blocks to create groups of frequencies, wherein a width of each block is a width of a second pre-determined range that is smaller than a width of the shift-to frequency range, and comprises shifting the frequency content of each block within the shift-to frequency range to create shifted frequency content, and comprises centering the shifted frequency content of each block at a frequency within the shift-to frequency range.

23. The computer-implemented method of claim 22, wherein each block is separated from another block by a pre-determined distance within the shift-to frequency range.

24. The computer-implemented method of claim 22, wherein each block is positioned within the shift-to frequency range at a random position.

25. The computer-implemented method of claim 24, wherein clustering the selected frequencies of the transformed input signal further comprises, for each clustered frequency, calculating a surface under an amplitude spectrum curve for a third pre-determined range, and removing the clustered frequencies where the surface is less than a pre-determined threshold.

26. The computer-implemented method of claim 19, further comprising: estimating an amplitude spectrum of the transformed input signal; wherein sorting the plurality of frequencies of the transformed input signal further comprises grouping the plurality of frequencies into a plurality of contiguous blocks, wherein each block comprises one or more contiguous frequencies; wherein selecting the plurality of sorted frequencies of the transformed input signal further comprises estimating a surface under an amplitude spectrum for each block, normalizing the surface of each block to a maximum value, and removing each block whose surface is less than a pre-determined threshold; wherein shifting the selected frequencies of the transformed input signal further comprises shifting the frequency content of one or more shifted blocks of the blocks whose surfaces are the largest within the shift-to frequency range, and centering the shifted frequency content of the one or more shifted blocks at a frequency within the shift-to frequency range.

27. A system for converting an input into one or more haptic effects using frequency shifting, the system comprising:
a memory configured to store a haptic conversion module; and
a processor configured to execute the haptic conversion module stored on the memory;
wherein the haptic conversion module is configured
to receive an input signal that comprises one of an audio signal, a video signal, or an acceleration signal;
to perform a Fourier transform of the input signal to generate a transformed input signal that identifies frequency content of the input signal, the frequency content including a plurality of frequencies;
to sort the plurality of frequencies of the transformed input signal by an amplitude to generate sorted frequencies,
to select a plurality of the sorted frequencies of the transformed input signal according to the sorted frequencies having a largest amplitude to determine selected frequencies,
to shift the selected frequencies of the transformed input signal from their existing frequencies to frequencies within a shift-to frequency range to generate a frequency-shifted signal;
to perform an inverse Fourier transform of the frequency-shifted signal to generate a haptic signal; and
to generate the one or more haptic effects based on the haptic signal.

28. The system of claim 27, wherein the haptic conversion module is further configured to cluster the selected frequencies of the transformed input signal.

29. The system of claim 27,
wherein the haptic conversion module is further configured to shift the selected frequencies to the shift-to frequency range, wherein the shift-to frequency range comprises a resonant frequency of a haptic output device.

30. The system of claim 28,
wherein the haptic conversion module is further configured to sort the plurality of frequencies by their normalized amplitudes;
wherein the haptic conversion module is further configured to select the plurality of sorted frequencies by selecting one or more the plurality of sorted frequencies whose amplitudes are greater than a pre-determined threshold;
wherein the haptic conversion module is further configured to cluster the selected frequencies by, for each selected frequency, removing the selected frequency if there is another frequency within a first pre-determined range that has an amplitude greater than the amplitude of the selected frequency to generate clustered frequencies; and
wherein the haptic conversion module is further configured to shift the selected frequencies by grouping the clustered frequencies within one or more blocks to create groups of frequencies, wherein a width of each block is a width of a second pre-determined range that is smaller than a width of the shift-to frequency range, by shifting the frequency content of each block within the shift-to frequency range to create shifted frequency content, and by centering the shifted frequency content of each block at a frequency within the shift-to frequency range.

31. The system of claim 30, wherein each block is separated from another block by a pre-determined distance within the shift-to frequency range.

32. The system of claim 30, wherein each block is positioned within the shift-to frequency range at a random position.

33. The system of claim 32, wherein the haptic conversion module is further configured to, for each clustered frequency, calculate a surface under an amplitude spectrum curve for a third pre-determined range, and remove the clustered frequencies where the surface is less than a pre-determined threshold.

34. The system of claim 27,
wherein the haptic conversion module is further configured to estimate an amplitude spectrum of the transformed input signal;
wherein the haptic conversion module is further configured to group the plurality of frequencies into a plurality of contiguous blocks, wherein each block comprises one or more contiguous frequencies;
wherein the haptic conversion module is further configured to select the selected frequencies by estimating a surface under an amplitude spectrum for each block, normalize the surface of each block to a maximum value, and remove each block whose surface is less than a pre-determined threshold;
wherein the haptic conversion module is further configured to shift the frequency content of one or more shifted blocks of the blocks whose surfaces are the largest within the shift-to frequency range, and
center the shifted frequency content of the one or more shifted blocks at a frequency within the shift-to frequency range.

* * * * *